Figure 1:
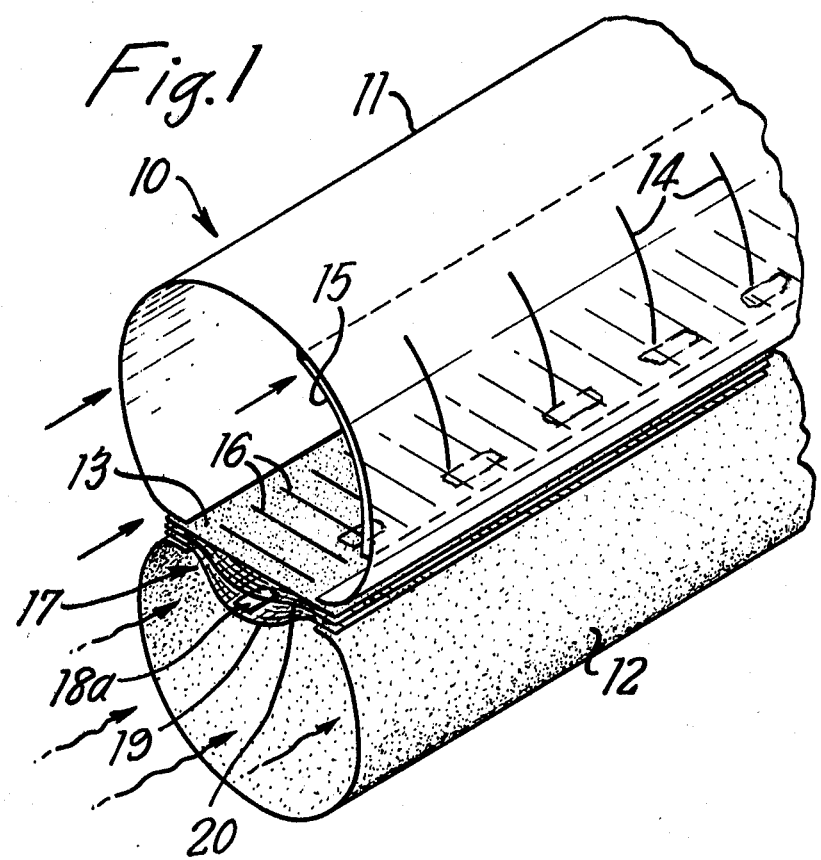

United States Patent [19]

Prewer

[11] 4,291,499
[45] Sep. 29, 1981

[54] PROPAGATION OF PLANTS

[76] Inventor: John R. Prewer, 82 Thomas More House, London, England, EC2Y 8AB

[21] Appl. No.: 66,317

[22] Filed: Aug. 14, 1979

[51] Int. Cl.³ .................... A01G 31/00; A01C 1/04
[52] U.S. Cl. ........................... 47/59; 47/17; 47/56; 47/57.6; 47/84; 47/86; 47/1 R; 47/58; 47/79; 47/28 A
[58] Field of Search ................... 47/17, 59–65, 47/79, 56, 57.6, 1, 84, 86, 28 A, 1.4, 14

[56] References Cited

U.S. PATENT DOCUMENTS

| | | | |
|---|---|---|---|
| 2,431,890 | 12/1947 | Raines | 47/1 |
| 2,732,663 | 1/1956 | Dewey | 47/1.4 |
| 3,362,106 | 1/1968 | Goldring | 47/56 |
| 3,579,907 | 5/1971 | Graves | 47/17 |
| 3,872,621 | 3/1975 | Greenbaum | 47/87 |
| 3,955,317 | 5/1976 | Gudin | 47/62 |
| 4,000,580 | 1/1977 | Biehl | 47/14 |
| 4,209,943 | 7/1980 | Moeller et al. | 47/1.4 |

FOREIGN PATENT DOCUMENTS 922106  3/1973  Canada .................. 47/64

Primary Examiner—Robert E. Bagwill
Attorney, Agent, or Firm—Hopgood, Calimafde, Kalil, Blaustein & Lieberman

[57] ABSTRACT

A propagator for the cultivation of plants in a controlled environment comprising upper and lower elongate containers having a common perforated wall, a plurality of plant seeds supported in spaced relation by or adjacent the common wall, means for injecting liquid in the form of vapor or droplets into an end of each of the elongate containers and means for maintaining a pressure in the elongate containers greater than atmospheric pressure.

21 Claims, 9 Drawing Figures

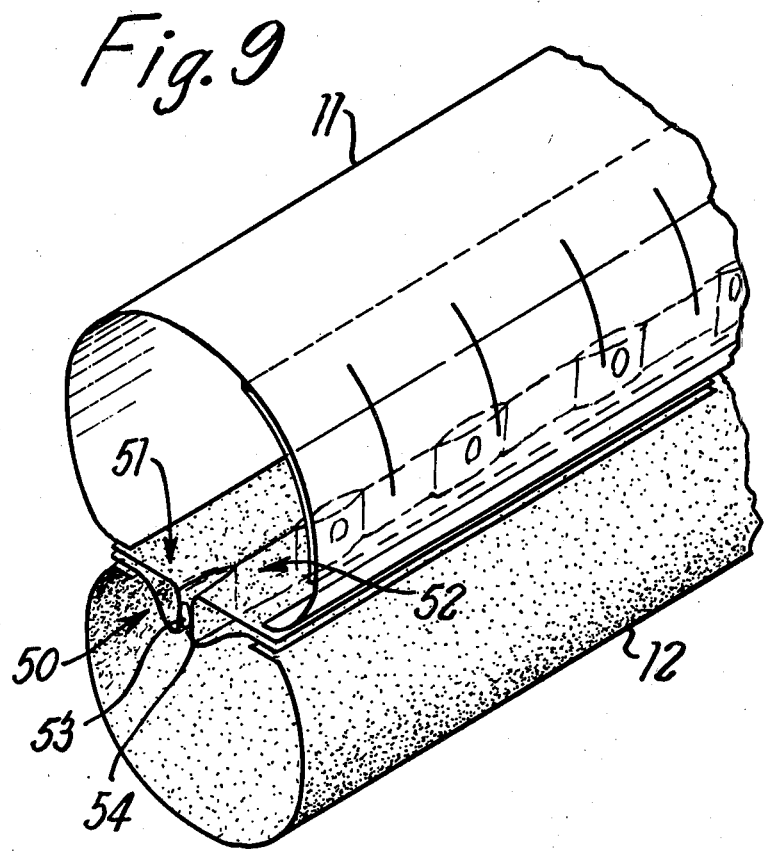

Suspended beneath the wall 13, within the lower container 12 is an elongate web 17, which extends the length of the tubular container 12 and which carries a plurality of plant seeds 18 each of which is contained in a sachet 18a. The web 17 comprises two strips 19, 20 of a synthetic plastics mesh or net material between which the sachets 18a are sandwiched. The strips 19, 20 may be heat, seam welded to form pockets each of which holds a single seed 18 or sachet 18a.

Figure 2:
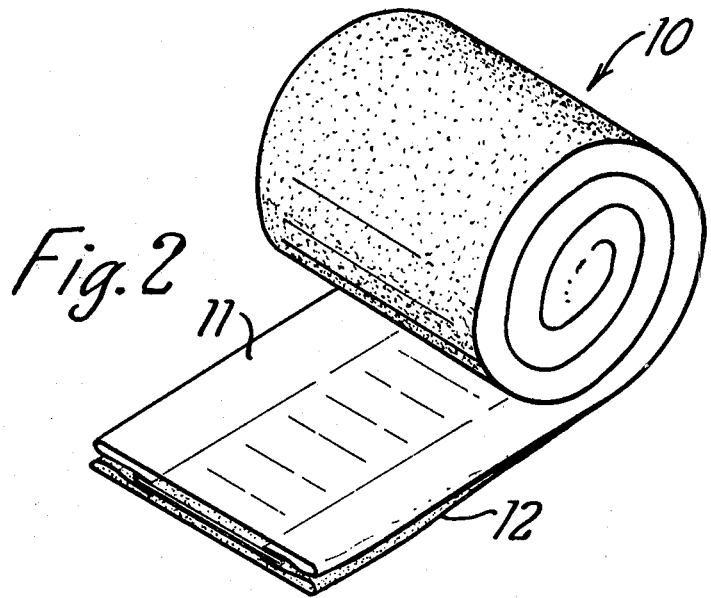
Figure 3:
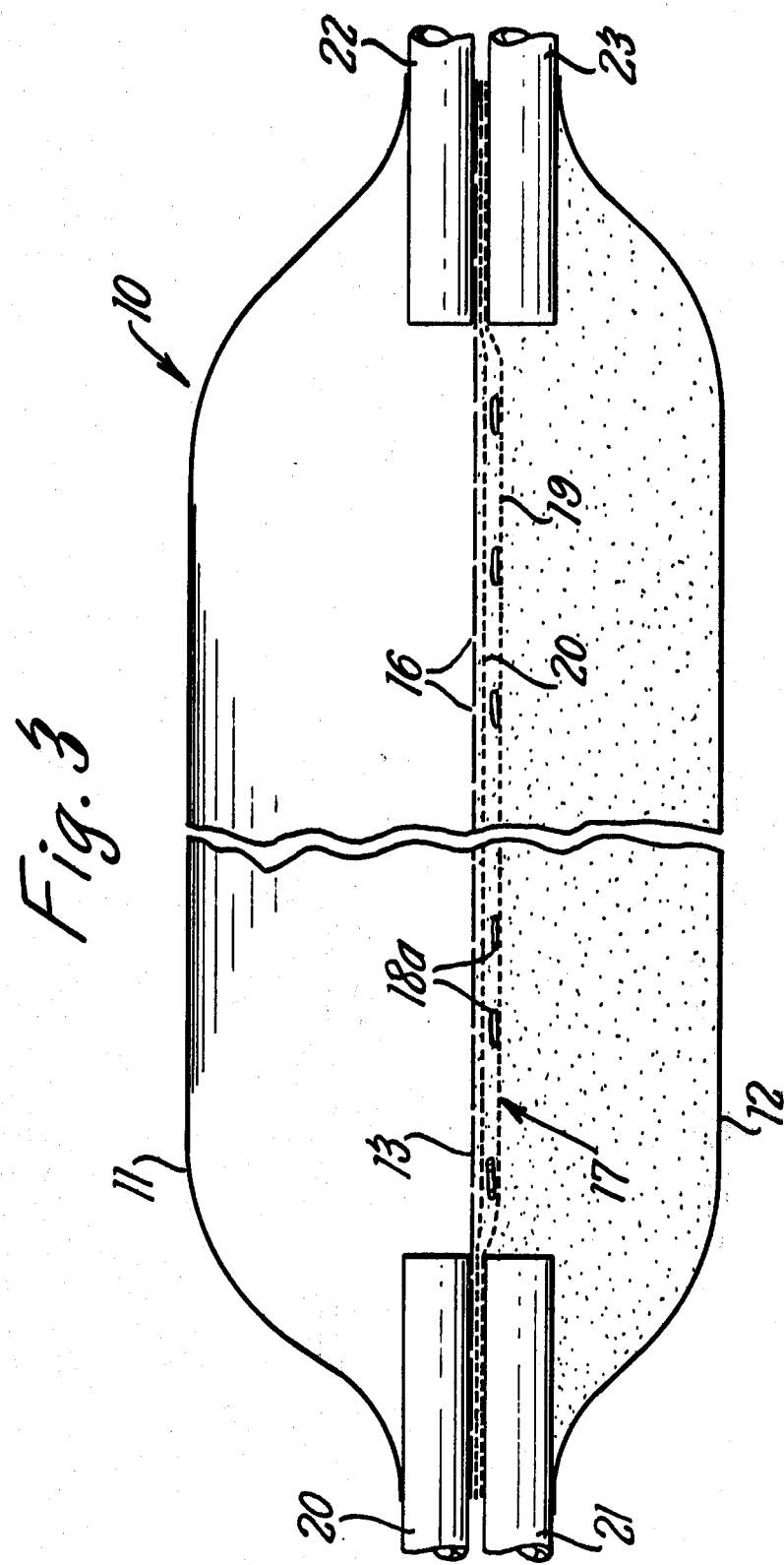
Figure 4:
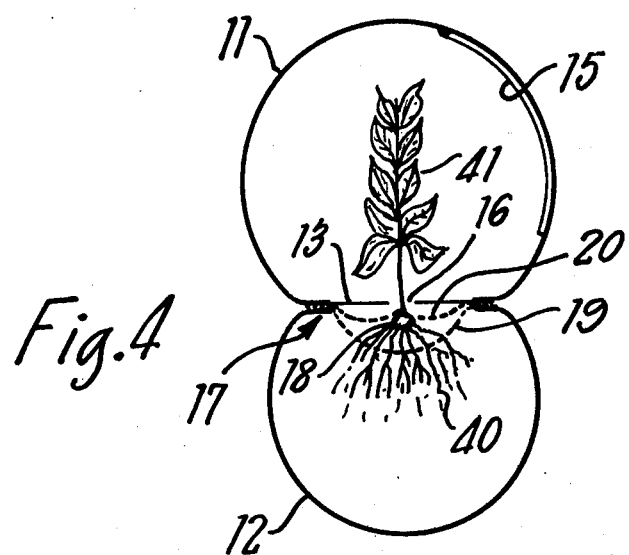
Figure 5:
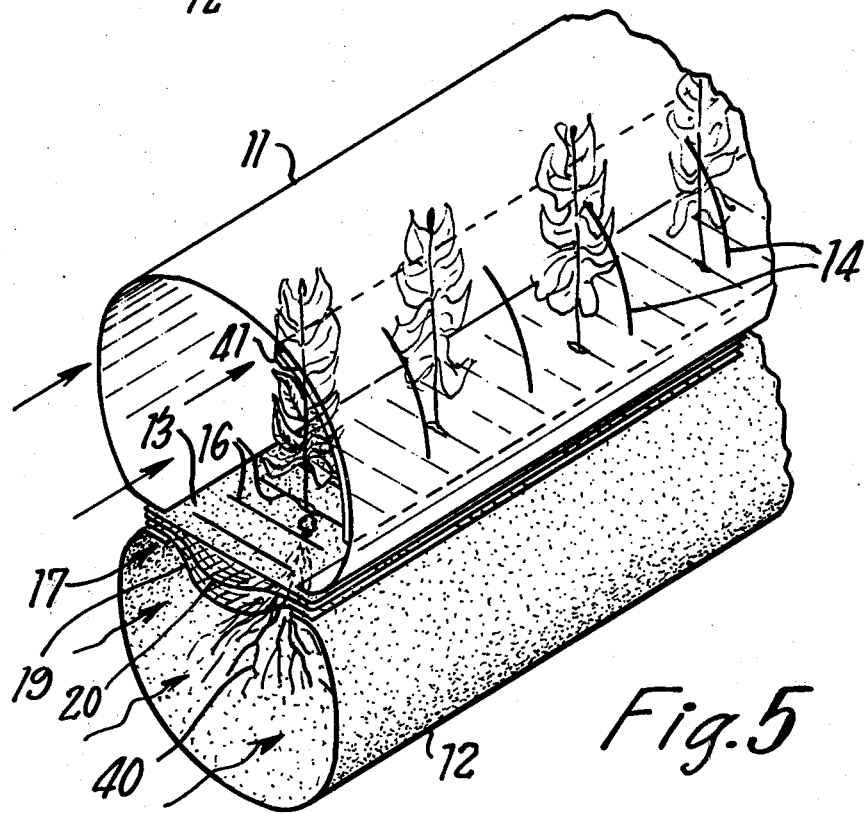

The propagator 10, comprising the upper and lower containers 11 and 12, the wall 13 and web 17 can be economically manufactured by a simple heat-sealing process. Initially the longitudinal edges of the web 17 are heat sealed to the edge portions of the wall 13. The longitudinal edges of the upper container 11 are then turned inwardly and joined by heat sealing to the upper surface of the wall 13 and finally the longitudinal edges of the lower container 12 are turned inwardly and joined by heat sealing to the bottom surface of the web 17. The resulting composite tubular structure can be flattened and rolled up into a compact package for transport and storage, as shown in FIG. 2.

The ends of the upper and lower containers can be closed and sealed around flexible inlet pipes 20, 21 and flexible outlet pipes 22, 23 by crimping and heat sealing the end portions of the upper and lower containers on to the inlet and outlet pipes. If the inlet and outlet pipes are made from a similar flexible material to the containers this can be done before the propagator is rolled up and packaged. If on the other hand the inlet and outlet tubes are required in a relatively rigid form it may be more convenient to close the ends of the propagator and seal the inlet and outlet pipes in place on site.

The plant seeds 18 may be contained in the sachets 18a as shown or alternatively may be placed directly in the web 17. It is also envisaged that each individual seed may be contained in a bag or sachet of soil, fertiliser and chemical nutrients to assist in the growth of the plant.

Figure 6:
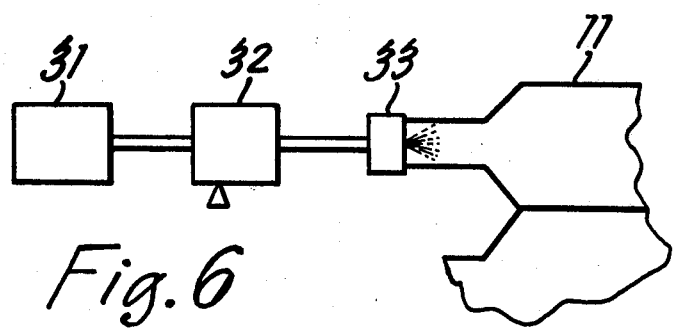
Figure 7:
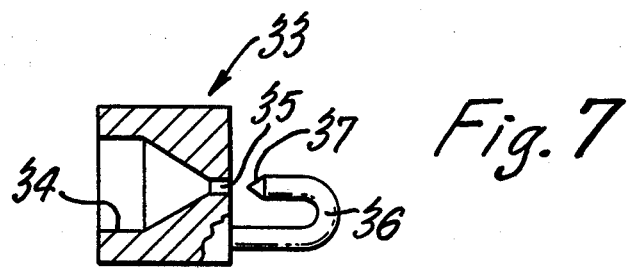

When the propagator 10 is ready for use it is transported to the site, unrolled and each container is connected to a separate gas and liquid injection apparatus, one of which is indicated generally at 30 in FIG. 6. The injection apparatus 30 comprises a reservoir 31 of liquid to be injected into the container, a high pressure pump 32 having an air intake 32a and a nozzle 33 for connection to one of the inlet pipes 20 or 21. The nozzle 33 is of the type known as a fog nozzle, the construction of which is fully disclosed in U.S. Pat. No. 3,894,691. Briefly, the nozzle has a fluid passage 34 which converges towards a very small outlet orifice 35. Immediately adjacent the outlet orifice is a tapered impact pin 36 having a cone shaped impact surface 37 which breaks up liquid emerging under pressure from the orifice into a fog of liquid particles or droplets. The particles of liquid are sufficient small, approximately 10 microns, to remain airborne when they leave the nozzle.

When each container of the propagator 10 has been connected to an injection system 30 with a nozzle 33 in communication with each container 11 and 12, air is initially pumped through the injection system into the upper and lower containers to inflate the containers into a tubular shape. Water is then supplied to the pump 32 and injected into the upper container 11 in the form of a fog of liquid droplets. In order to achieve a fog of droplets it is necessary to generate a pressure of approximately 500 psi at the nozzle. The liquid droplets will pass down the upper container. Most of the liquid will evaporate before it reaches the end of the container, but any which reaches the end will pass out through the outlet pipe 22 and can be recycled. Initially, liquid will collect on the inside surface of the upper container and will trickle through the slits 16 and on to the sachets 18 to moisten the seeds.

The upper container 11 is transparent and exposed to sunlight, while the lower container 12 and the wall 13 are opague and preferably formed from a black polythene. As a result, the temperature in the upper container will rise, under exposure to the sun, and the combination of heat and moisture will promote germination of the seeds and growth of the plants. When germination takes place, the roots 40 of each plant will grow down through the mesh of the web 17 into the lower container 12 and the foliage 41 will grow upwardly through the slits 16 of the wall 13 into the upper container 11. As the wall of the lower container 12 is opaque the root growth 40 is not subjected to light.

As soon as root growth occurs a liquid nutrient is supplied to the nozzle 33 which is connected to the lower container so as to inject liquid nutrients into the lower container 12 in the form of airborne droplets which will settle on the roots and promote growth. Liquid may be injected intermittently into the upper and lower containers, but it will be appreciated that the gas pressure in both containers will be maintained at a constant level.

It will be understood that suitable controls will be provided in the fog injection apparatus 30 to enable the liquid flow to the nozzles to be controlled, the pressure in the containers to be regulated and monitored and both the liquid and air injected into the containers to be filtered. Automatic timing mechanisms may also be included to enable liquid to be injected intermittently at regularly timed periods into the container.

As the plants grow and the foliage and root growth increases, the pressure in the containers may be increased so as to inflate the containers further to accommodate the increased growth.

When the plants are fully grown and are ready for harvesting, they can be removed from the upper container through the slots 14 formed in the side wall of the container. As each plant is removed, there will be a momentary loss of pressure through the slot 14 but the slot will be immediately closed once the plant has been removed by the flap 15.

It is also envisaged that the plants may be harvested by stripping off the bottom container 12 and the root growth and severing the upper container between each plant so as to leave the foliage of each plant surrounded by and partially packaged by the material of the upper container.

Figure 8:
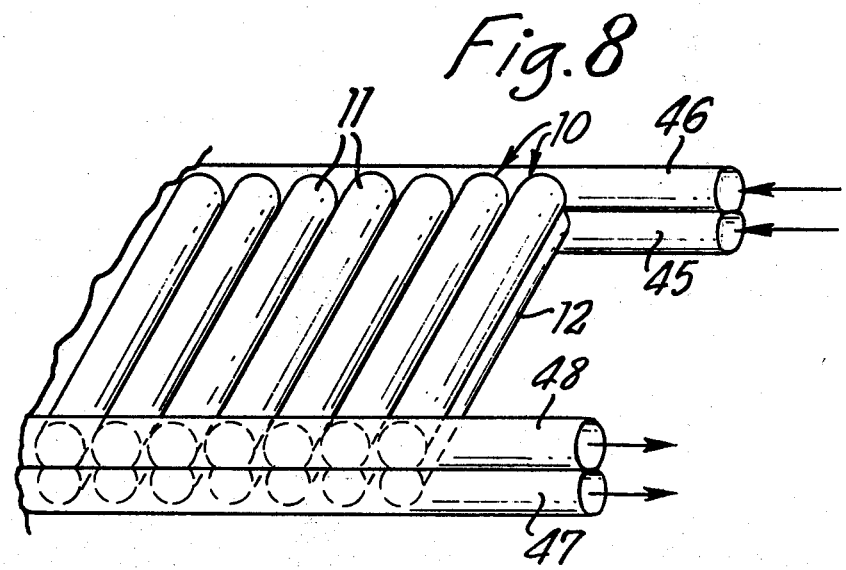

It is intended that a plurality of the propagators 10 will be laid out side-by-side as shown in FIG. 8 to provide a large area of plant cultivation. The propagators 10 are arranged side-by-side in parallel with the upper containers 11 exposed to the sun and the lower containers resting on the ground or any other suitable surface. The inlet ends of the lower containers are all connected to a single fog inlet main 45 and the inlet ends of the upper containers 11 are all connected to a single fog inlet main 46. The outlet ends of the upper and lower containers are similarly connected to fog outlet mains 47 and 48. The fog inlet mains are connected to nozzles 33 for the injection of liquid into the containers and the outlet mains 47 and 48 are connected into the fog injection system so as to recycle any liquid emerging from the outlet ends of the propagators 10.

PROPAGATION OF PLANTS

The present invention relates to a process for the cultivation of plants in a controlled environment and a propagator for carrying out the process of cultivation.

There is a worldwide need for an economic and simple method of cultivating plants under a wide variety of soil and climatic conditions which is suitable for the propagation of good quality fruit, vegetables and flowers. At the present time, fruit, vegetables and flowers are grown by conventional, agricultural or horticultural techniques which are both capital and labour intensive and involve disease and pest control problems.

Various solutions to these problems have already been proposed. Some of these proposals involve the use of synthetic plastic tubular containers for the plants which afford some protection from the surrounding environment. However, all of these known proposals have been relatively capital intensive and have not been entirely successful in eliminating disease and pest control problems.

It has also been proposed to inject liquid in the form of a mist or vapour into an elongate plant container or greenhouse to moisten and feed the foliage of the plants, but this method of cultivation does not deal with the problems associated with the root growth of the plants.

It is therefore an object of the present invention to provide a process for the propagation of plants and apparatus for carrying out the process of the present invention which overcomes or substantially reduces the problems of cost, disease and pest control and proper root and foliage feeding, all of which problems are inherent in conventional agricultural and horticultural propagation techniques.

According to one aspect of the present invention there is provided a propagator for the cultivation of plants in a controlled environment comprising upper and lower elongate containers having a common perforated wall, a plurality of plant seeds supported in spaced relationship by the common wall, means for injecting liquid in the form of vapour or droplets into an end of each of the elongate containers and means for maintaining a pressure in the elongate containers greater than atmospheric pressure.

According to a further aspect of the present invention there is also provided a process for the cultivation of plants in a controlled environment comprising the steps of:
  providing a propagator comprising a substantially elongate lower container adjacent a substantially elongate upper container, a common perforated wall between the upper and lower containers and a plurality of plant seeds supported in spaced relationship by the common wall;
  maintaining a pressure greater than atmospheric pressure in the upper and lower containers; and
  injecting liquid in the form of airborne droplets into the upper and lower containers under sufficient pressure to propel the liquid droplets down the containers.

Preferably the upper and lower containers are formed from a flexible synthetic plastics material and are maintained under pressure in a permanently inflated condition. By maintaining a pressure within the containers greater than atmospheric pressure, a controlled environment is created with the risk of contamination from the atmosphere minimised.

The upper container is preferably substantially transparent and the lower container is preferably opaque so that plant foliage in the upper container is subjected to sunlight whereas root growth takes place in the lower container in a substantially dark environment.

By injecting liquid, which will comprise principally water, under a sufficiently high pressure through an appropriate nozzle into the upper container, fine droplets of water will be deposited on the inner surface of the container and on the foliage of the plants. Initially water collecting on the inner surface of the containers will run down, through the common wall and moisten the plant seeds to initiate germination.

When root growth occurs, particles or droplets of liquid nutrient are then injected into the lower container and are carried down the lower container so as to settle on the root growth and promote the growth of the plants.

If the upper and lower containers are formed from a synthetic plastics material, preferably a sheet polythene, the propagator can be folded or rolled up in a flat condition for packaging and transport, carried to the site and laid out ready for inflation and use.

The propagator of the present invention can be laid on the ground, any other suitable hard surface or alternatively can be floated on water.

Preferred forms of the present invention will now be described with reference to the accompanying drawings, in which:

FIG. 1 is a perspective view of a section through a propagator according to the present invention;

FIG. 2 is a perspective view of the propagator of FIG. 1 shown in a flat and partially rolled up condition;

FIG. 3 is a side view of the propagator of FIG. 1 in its fully inflated condition;

FIG. 4 is a section through the propagator of FIG. 1 showing a fully grown plant within the propagator;

FIG. 5 is a perspective view similar to FIG. 1 but showing plants fully grown within the propagator;

FIG. 6 is a diagrammatic illustration of liquid supply and injection apparatus for the propagator of FIG. 1 to 5;

FIG. 7 is a section through a nozzle forming a part of the injection apparatus of FIG. 6;

FIG. 8 is a perspective view of an arrangement of a plurality of the propagators of FIGS. 1 to 5; and FIG. 9 is a perspective view of a modification of the propagator of FIGS. 1 to 5.

In FIGS. 1 to 4 a propagator for the cultivation of plants in a controlled environment is indicated generally at 10. The propagator 10 comprises an upper elongate container 11 and a lower elongate container 12 divided by a common wall 13. Both the upper and lower containers are in the form of flexible tubes made of a synthetic plastics material such as polythene sheet. The wall of the upper container 11 is substantially transparent and the wall of the lower container is substantially opaque and preferably formed from black polythene sheet. The upper container 11 is formed along one side with a series of spaced, circumferentially extending slots 14. A flap 15 is attached to the inside of the wall of the container 11 so as to overlie and close the slots 14 when the container is inflated. The common wall 13, which divides the upper and lower containers comprises a continuous sheet of flexible plastics material and is perforated by a plurality of slits 16. The wall 13 is substantially opaque and preferably formed from the same material as the lower container 12.

Modifications may be made to the structure of the upper and lower containers, the wall 13 and the web which holds the seeds. For instance, the wall 13 and web 17 of FIG. 1 may be replaced, as shown in FIG. 9, by a membrane 50 which forms both the common wall and the seed carrying web. The membrane 50 is formed from two elongate strips 51 and 52 of an opaque flexible material which are heat seam welded together to form a vertically extending web 53 having upwardly and downwardly open pockets 54 each of which contains a plant seed.

The edge portion of the elongate strips 51 and 52 are located between the longitudinal edge portions of the upper and lower containers and are heat seam welded to the upper and lower containers to form the complete sealed and closed tubular propagator.

In use, the moisture condensing on the inner surface of the upper container 11 runs down into the pockets 54 in the web 53 to moisten the plant seeds and the foliage and root growth can then grow upwardly and downwardly respectively from the pockets 54 into the upper and lower containers.

It is envisaged that, the droplets of liquid injected into the upper and lower containers and the plants themselves may be oppositely charged so as to maximise the deposition of droplets onto the roots and foliage.

If the upper containers of the propagator 10 is subjected to sufficient warmth from the sun it will not be necessary to provide any other form of heating to cause germination of the plant seeds and satisfactory growth. However, if there is insufficient heat from the sun, then it is envisaged that the air injected into the containers through the nozzles 33 to inflate the containers may be heated to a sufficient temperature to ensure that germination and plant growth takes place.

Preferably, the upper container is kept at a slightly higher pressure than the lower container to ensure that the fog of droplets containing nutrients does not pass from the lower container into the upper container. If necessary bleed holes may be provided in the lower container to ensure that a pressure differential is always maintained.

It is also envisaged that, if the web carrying the plant seeds is divided into a plurality of pockets alternate pockets may be initially sealed so that the seeds in the sealed pockets are not subjected to moisture and do not therefore germinate. It is thus possible to harvest the first crop and then open the previously unused seed pockets to activate and germinate a second crop. Alternatively, a plurality of seed carrying webs may be provided between the upper and lower containers, each web being activated in succession to provide for successive crops.

It will be appreciated that the choice of liquid nutrients fed to the lower container in the form of a fog of droplets will be determined by the requirements of the plants as will the water content of the fog injected into the upper container.

The upper half of the upper container 11 of the propagator 10 can be semi-opaque if required so as to limit the amount and direction of light entering the container. The propagators 10 can be placed directly in contact with the ground or alternatively can be floated on water. If the water is shallow, it can be used as a thermal storage system to help damp out rapid temperature changes in the containers.

It is envisaged that the propagator 10 will be transported and stored in a flat or rolled up condition and will be inflated when ready for use. Initially both the upper and lower tubular containers need only be inflated sufficiently to allow air space for the initial growth of the root system and the leaf system. The containers can then be further inflated as the root system and leaf system grows. Where a plurality of propagators 10 are laid out side-by-side, as the containers are inflated they will jostle with one another and find their own room and space.

It will be seen that the present invention provides a system for the propagation of plants which involves very low capital costs, which is easy to transport being light in weight and compact and which requires no permanent structure. The labour requirements for maintaining the system while the plants are growing and also for harvesting the plants is low and the system also provides a very high degree of environmental control.

Since the upper and lower containers are pressurised and the air injected under pressure into the containers can be filtered, the chances of disease occurring in the plants or insect attack is reduced to an absolute minimum.

Plants grown in the system require very little water, the system requires relatively little energy input and the crop is clean when harvested.

I claim:

1. A propagator for the cultivation of plants in a controlled environment comprising upper and lower elongate containers having a common perforated wall, a plurality of plant seeds supported in spaced relation by or adjacent the common wall, means for injecting liquid in the form of vapor or droplets into an end of each of the elongate containers and means for maintaining a pressure in the elongate containers greater than atmospheric pressure.

2. A propagator as claimed in claim 1, wherein the upper container comprises a tube of flexible substantially transparent material, the lower container comprises a tube of flexible substantially opaque material, and the common wall between the upper and lower containers comprises a sheet of flexible, substantially opaque material.

3. A propagator as claimed in claim 2 wherein the upper container, the lower container and the common wall are formed from a synthetic plastics material seam welded together to form two substantially separate containers.

4. A propagator as claimed in claim 3, wherein the plant seeds are carried in an elongate web which is suspended within the lower container beneath the common wall.

5. A propagator as claimed in claim 4, wherein the elongate web comprises two layers of open mesh material, the plant seeds being sandwiched between the two layers.

6. A propagator as claimed in claim 5, wherein the common wall is formed with a series of apertures to allow for the growth of each plant upwardly through the common wall and into the upper container.

7. A propagator as claimed in claim 4, wherein the elongate web includes two vertically aligned layers forming a series of pockets, each of which contains a plant seed, each pocket having upwardly and downwardly facing openings to allow for foliage and root growth respectively.

8. A propagator as claimed in claim 7, wherein the upper container is formed with a plurality of slits spaced along the length of the container for access to the interior of the container.

9. A propagator as claimed in claim 8, wherein the slits are normally covered by a hinged flap attached to the inside surface of the upper container and held against the wall of the container by the internal pressure of the container to normally seal the slits.

10. A propagator as claimed in claim 1, wherein the means for injecting droplets into each elongate container comprises a nozzle and means for feeding liquid and air to the nozzle at a pressure sufficient to inject fine droplets of liquid into an end of the elongate container and maintain a pressure within the container above atmospheric.

11. Apparatus for the cultivation of plants in a controlled environment comprising a plurality of propagators as claimed in claim 10 extending horizontally in side by side relationship, upper and lower common inlet tubes in communication with the inlet ends of the upper containers and the lower containers respectively, an upper said nozzle in communication with the upper inlet tube and a lower said nozzle in communication with the lower inlet tube and upper and lower outlet tubes in communication with the outlet ends of the upper and lower containers respectively.

12. A process for the cultivation of plants comprising the steps of:
providing a propagator comprising an inflatable substantially elongate lower container adjacent an inflatable substantially elongate upper container, a common perforated wall between the upper and lower containers and a plurality of plant seeds supported by the common wall;
maintaining a pressure sufficiently greater than atmospheric pressure in the upper and lower containers so as to inflate the containers and maintain the containers in an inflated condition; and
injecting liquid in the form of airborne droplets into the upper and lower containers under sufficient pressure to propel the liquid droplets down the containers.

13. A process as claimed in claim 12 wherein the lower container is substantially opaque and the upper container is substantially transparent.

14. A process as claimed in claim 12, wherein the upper and lower containers are tubular and formed from a flexible material and including the further steps of:
periodically increasing the pressure in the containers to inflate and expand them further to allow for the foliage and root growth of the plants.

15. A process as claimed in claim 12 including the further step of:
adding nutrients to the liquid injected into the lower container.

16. A process as claimed in claim 12 including the further step of:
oppositely charging the liquid droplets and the plants to increase the deposition of liquid droplets on the root and foliage growth of the plants.

17. A process as claimed in claim 12 including the further step of:
collecting and recirculating liquid passing through the containers.

18. A process as claimed in claim 12 wherein liquid is injected into the containers at a pressure of approximately 500 psi.

19. A process as claimed in claim 18 wherein the size of the liquid droplets is approximately 10 microns.

20. A process as claimed in claim 12, wherein the pressure within the upper and lower containers is maintained within the range of 10 to 40 lbs psi, preferably 30 lbs psi.

21. A process as claimed in claim 12 wherein liquid is injected into the upper and lower containers intermittently while maintaining a substantially constant pressure within the containers.

* * * * *